United States Patent [19]

Durst et al.

[11] 3,872,229

[45] Mar. 18, 1975

[54] FOOD COMPOSITION HAVING A NUT-LIKE TEXTURE AND METHOD FOR PRODUCING THE SAME

[75] Inventors: Jack R. Durst, Osseo; Warren L. Ganske, Golden Valley, both of Minn.

[73] Assignee: The Pillsbury Company, Minneapolis, Minn.

[22] Filed: Oct. 15, 1973

[21] Appl. No.: 406,747

Related U.S. Application Data

[63] Continuation of Ser. No. 172,337, Aug. 12, 1971, abandoned.

[52] U.S. Cl. ............... 426/62, 426/98, 426/104, 426/164, 426/177, 426/208, 426/362, 426/364
[51] Int. Cl. .......................... A23c 1/18, A23c 1/00
[58] Field of Search ............ 426/98, 104, 486, 101, 426/202, 199, 362, 194, 201

[56] References Cited
UNITED STATES PATENTS

| | | | |
|---|---|---|---|
| 2,298,644 | 10/1942 | Hummel | 426/486 |
| 2,952,544 | 9/1960 | Durst et al. | 426/98 |
| 2,955,040 | 10/1960 | Avera | 426/164 |

*Primary Examiner*—Raymond N. Jones
*Attorney, Agent, or Firm*—James V. Harmon; Michael D. Ellwein

[57] ABSTRACT

Simulated nutmeat products and other products having a nut-like texture are prepared by forming a homogeneous dispersion composed of minute droplets of fat or oil suspended in a continuous phase composed of a hydrophilic fiml-former such as an aqueous protein suspension and mixing the dispersion under conditions which exclude gas such as vacuum treatment of at least 10 inches of mercury or mixing in a closed vessel filled with the dispersion. The pieces are thereafter dried in air to bring the final moisture content to between 1 and 3.5 percent.

13 Claims, 3 Drawing Figures

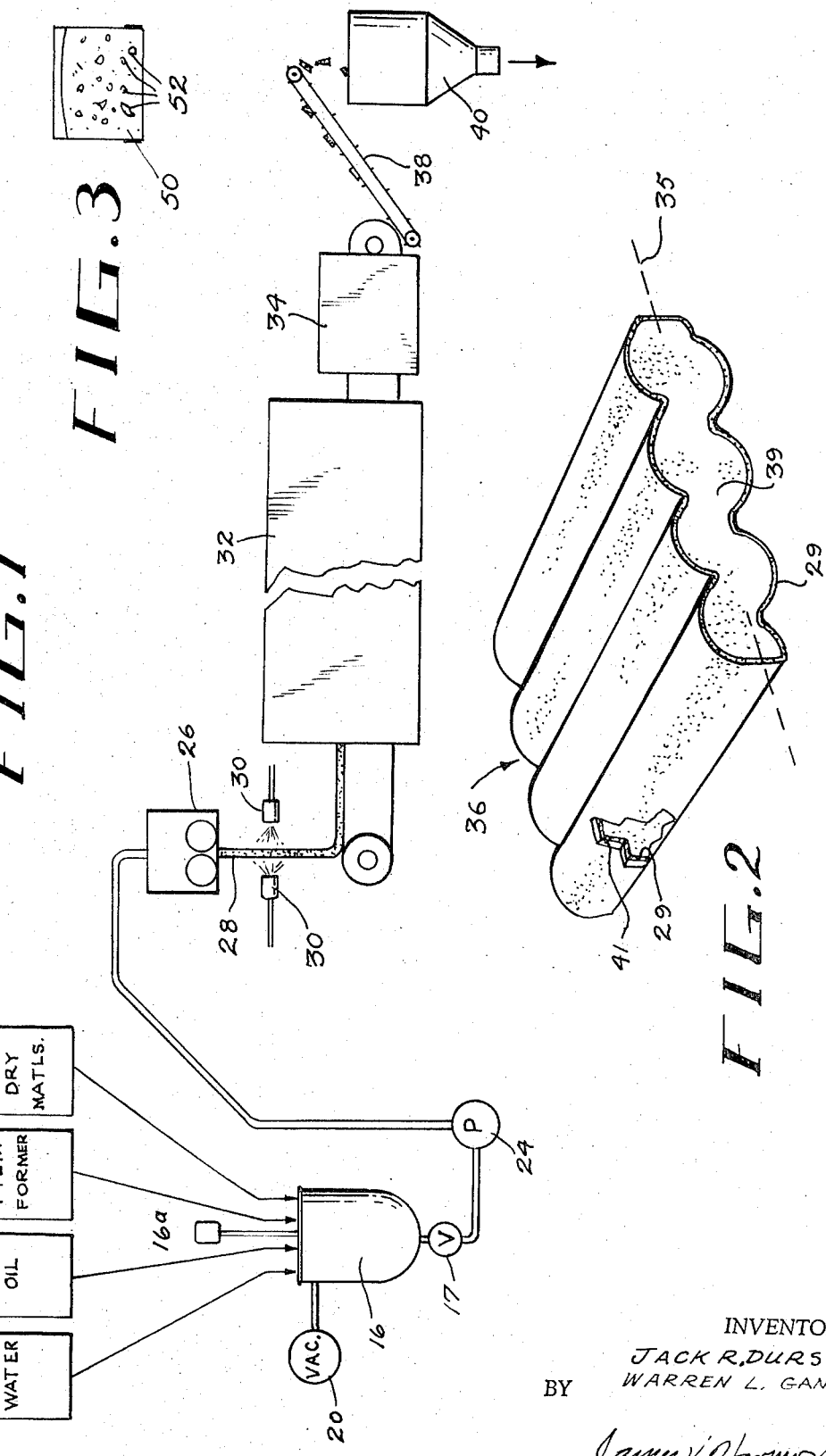

FOOD COMPOSITION HAVING A NUT-LIKE TEXTURE AND METHOD FOR PRODUCING THE SAME

This is a Continuation, of application Ser. No. 172,337, Filed Aug. 12, 1971 now abandoned.

FIELD OF THE INVENTION

The present invention relates to the production of foods having crunchy nut-like chewing characteristics. The invention is particularly useful in preparing simulated nutmeats.

PRIOR ART

U.S. Pat. No. 2,952,544 relates to the production of nut-like food products formed by drying dispersions composed of a continuous phase consisting of a dispersion of an hydratable film former in which is suspended a water immiscible liquid. These products, while very good, do not always have a texture which can be controlled. For example, using some starting materials the texture is nut-like when chewed but instead of having the desired smearing effect after the initial crunchy character is noted, the product seems to splinter into little pieces which catch in the back of the throat. Other prior products also soften excessively if used in moist food such as ice cream or are too brittle at the low temperature of ice cream. In addition, flavors are sometimes difficult to perceive. Moreover, while it has been desirable to use less water in the dispersion (to shorten drying times and expense), this has been difficult to accomplish since too little water makes the dispersion viscous and difficult to extrude. In addition, the oil tends to run out of the finished product.

OBJECTS OF THE INVENTION

In view of these and other defects of the prior art, the present invention has among its objects the provision of an improved simulated nut product and process with the following characteristics and advantages: (a) the ability to consistently produce food products that simulate closely the texture of nutmeats with a process which can be efficiently and economically carried out on a commercial scale; (b) the provision of a dense nut-like structure having no tendency to exude fat; (c) the provision of an effective means for controlling texture and particularly the brittleness of the finished product; (d) the provision of an effective means for reducing the amount of water required in the dispersion; (e) the provision of a food product having the crunchy texture of nutmeats when used in moist or cold products such as ice cream; (f) an intense flavor sensation with a minimum of flavoring; (g) a provision for assuring the adherence of salt to the finished product; and (h) a provision for extending the shelf-life to a year or two and as much as six years in a polyethylene bag.

DESCRIPTION OF THE DRAWINGS

FIG. 1 is a schematic flow diagram showing one preferred method for preparing simulated nuts in accordance with the invention.

FIG. 2 is an enlarged perspective view of a finished product.

FIG. 3 is an ice cream product of the invention.

SUMMARY OF THE INVENTION

Briefly, the present invention provides an improved process for forming foods having a texture like that of nutmeats by forming a homogeneous dispersion composed of minute droplets of fat or oil suspended in a continuous phase composed of a hydrophilic film-former such as an aqueous protein suspension or other edible polymer and mixing the dispersion under conditions which exclude gas, e.g. by vacuum treatment of at least about 10 inches of mercury or by mixing in a vessel completely filled with the dispersion. The pieces are thereafter dried in air to bring the final moisture content to between 1 and 10 percent and preferably less than 3.5 percent.

The present invention provides a compact and highly nutritious food simulating a nutmeat in texture which can be made from food materials that are inexpensive and readily available. An important feature of the present invention is the provision of processing conditions that will insure the production of a product having a crisp, nut-like character when chewed without being so brittle as to produce granules when chewed that catch in the back of the throat.

DETAILED DESCRIPTION

The starting materials employed in the present invention are preferably formed into a liquid dispersion composed of an edible film-former as a continuous phase and a discontinuous phase comprising an edible oleaginous substance such as a fat which is liquid at the time the dispersion is made or an oil. Edible food particles such as flour, sugar or starch in powdered form may be dispersed in the oil, distributed between the encapsulated fat droplets or, if desired, suspended in the film-former. In any event, as a first step in forming the composition of the invention, an oleaginous substance is dispersed homogeneously in a continuous phase composed of a polar material; vis., the edible film-former under conditions which exclude air. The product is then extruded as a ribbon or band having a defined shape or molded. Water that is present in the continuous phase of the dispersion is removed from the product by drying. Since the moisture is present in the continuous phase, the suspended oil droplets are suspended in the hydrophilic film-former and upon drying, the oil droplets remain enclosed in the hydrophilic film-former.

The edible oleaginous substance may consist of any type vegetable or animal oil or fat or mixture thereof, including cottonseed oil, corn oil, lard, peanut oil, soy oil, safflower oil, butter, butter oil or margarine.

The oleaginous fraction of the nut product can be from about 10 to 80 percent by weight of the composition with the remaining fraction comprising the film-former on a dry weight basis exclusive of fillers and extenders. To produce different types of nuts, the ratio of oil to other dry constituents can be varied from about 30/70 to 75/25. Water should be present in the finished product in the amount of about 10 percent or less and preferably less than 5 percent by weight for adequate preservation.

The film-former may consist of any edible substance that will form a film around an edible oil using any known process. Examples are: nonfat milk solids, sodium caseinate, soy protein, egg albumen, egg yolk, wheat germ, gelatin, pea flour, bean flour, corn germ, dried whey, gelatinized starch, fish protein, bran protein, gum arabic, and other hydrophilic colloids, such as carboxy-methyl cellulose, agar agar, alginates, guar gum, carboxypropyl cellulose, carrageenin and combinations thereof.

Minor amounts of modifiers can be added to the film former if desired. Among such modifiers are salts, polysaccharides, such as glucose, sucrose or lactose, polyhydric alcohols, such as glycerin, and other edible food substances, such as starch and the like.

When wheat germ is used in synthetic nuts there are sometimes off flavors due to the enzymes in the wheat germ when the dispersion is dried at lower temperatures such as 140° F. or lower. These lower temperatures are used to prevent the volatilization of added flavors during the drying period. The enzymes can be inactivated if the dispersions are dried at temperatures between 170°–190° F. but many of the added flavors are lost. The enzymes are inactivated at these temperatures because of the initial water present before drying.

I have found that if the dispersion with added volatile flavors is initially heat treated at 180° F. for about 20 to 60 minutes (depending on thickness of the piece) and then the temperature is dropped to 140° F. for final drying that the enzyme activity is destroyed and many flavors that previously volatilized away can be kept in the synthetic nut.

Refer now to FIG. 1, which illustrates the invention by way of example. The process is begun by vigorously mixing the aqueous dispersion in heated vessel 16. Good results are obtained by mixing the oil components 10 and a dry powdered film-forming substance 12 as a slurry. Moisture 14 is then added with vigorous beating in mixer 16 until the particles of film-forming substance hydrate and coalesce into a continuous cellular phase which isolates and entraps globules of the oil component. Alternatively, the oil 10 components may be admixed with the previously hydrated film-forming substance 12 which admixture is then vigorously agitated to obtain dispersion of the oil component throughout the hydrated film-forming substance into a continuous phase cellular structure in which globules of the oil component are entrapped. Optional dry ingredients 18 such as sugal flavor, etc. are added. Any other procedure for combining the film-forming and the oil components which will affect the dispersion of the oil component through a continuous phase of the hydrated film former is also satisfactory.

In this instance, a vacuum 20, e.g. 20 to 30 inches of Hg is applied to the mixer 16 preferably near the beginning of mixing. The vacuum should be continued to the end of mixing to prevent air entrainment. It will be seen that the components of the dispersion are placed within a round-bottom heated mixing vessel 16 having an agitator motor 16a connected through suitable gearing (not shown) to a sweep-arm agitator (not shown) contacting the external side walls of the mixing vessel 16. The mixing is carried out until a homogeneous dispersion is achieved; about 10 to 30 minutes of mixing is usually sufficient. From the vessel 16, the dispersion is transferred through valve 17 by a high-pressures pump 24 to an extruder 26 which produces a ribbon 28 of a defined cross sectional shape.

In this case parallel ridges and grooves produce a ribbed pattern on both the upper and lower surfaces of the simulated nutmeat, especially if the nutmeats are to be sliced into small pieces. The resulting sliced pieces as seen in FIG. 2 are almost indistinguishable from real sliced nutmeats. The ribbon is coated with color 29 (FIG. 2) by spray nozzles 30 and passes to conveyor oven 32. Edible coloring material 29 is applied to the surface to simulate the nut skin. The ribbon then passes to conveyor oven 32 which reduces the moisture content to below about 10 percent, causing the product to become brittle. If salted, the salt is applied to the ribbon before it is heat set to obtain a strong bond between the salt and the product.

Drying can be accomplished immediately or if desired the pieces can be allowed to stand for a time before drying is carried out. If elevated temperatures are used for drying, it is preferred to use temperatures between about 100° and 200° F. In cases in which flavor development warrants it, the dispersion, after extrusion, is held at about 180° F. for 30 minutes to destroy enzymes followed by drying at a lower temperature to prevent volatilization of heat liable flavors. However, at the higher end of this scale some degree of roasting of the nut may take place which would be undesirable for some applications. Other forms of drying can be used, such as microwave drying. Generally, if the pieces are subjected to conditions of temperature above the boiling point of water, the pieces will puff and, therefore, no longer resemble nutmeats.

Drying converts the product to hard, dry crunchy pieces that have the desired crunch followed by a smearing sensation of real nutmeats and simulate almost precisely the texture and chewing characteristics of nuts.

Dispersing the oil component throughout the continuous phase of hydrated film former results in a gel-like mass which slowly dries with the oil globules in situ whereby the hydrated film former is gradually dehydrated without displacing any of the oil. If steam or oil vapor pressure is created through the application of too high a temperature during drying, the cellular structure will rupture and the oil particles will coalesce and bleed from the product. Hence, the drying is conducted over a relatively greater period of time, e.g. up to 20 hours.

If the ingredients are selectively employed, the finished product may be roasted to simulate nutmeats and even particular varieties of nutmeats.

The now hardened formed material passes into a slicer 34 which slices the ribbon transversely at 35 into pieces 36 (FIG. 2). The pieces are then carried via conveyor 38 to a coater 40 of any suitable kind where an edible coating such as bees wax, zein, mono and diglycerides or edible shellac or the like 41 is applied over the entire surface of each cut piece to thereby produce chunks or pieces having color 29 on the sides, top and bottom and a moisture-resistance coating on all surfaces including both ends 39. In this way the cut pieces are made to resemble cut-up nutmeats.

The edible coating 41 will protect the pieces from becoming soggy or soft, especially when the nutmeats are to be used in other food products such as ice cream. The coating 41 is then dried conventionally if necessary.

Any suitable, commercially available nut flavor or in the alternative, some other flavor such as chocolate, fruit, etc. can be employed in the required amount to impart the desired flavor and aroma. The flavor is very advantageously applied in the coating 41 rather than in the dispersion itself. If desired, the flavor may be used in both the coating and the dispersion.

Refer now to FIG. 3. One important aspect of the invention is that the simulated nutmeat 50 can be used successfully in ice cream 52. The simulated nut texture is a function of both its temperature and its composition. Its texture in ice cream is dependent upon the variety of nut to be simulated.

It was found that mixing the dispersion without gas contact produces a product that can be made less susceptible to exuding oil with a given amount of water in the dispersion. Conversely, a satisfactory product can be made using less water in the dispersion when no gas contact is permitted. Moreover, the use of a vacuum during mixing permits one to consistently produce a finished product having the desired crunchy texture followed by a smearing sensation when chewed that simulate closely the texture of real nutmeats without the tendency for some products to fracture in such a way that small pieces catch in the back of the throat.

A great improvement is obtained in the intensity of the flavor sensation perceived when the flavor is placed in the coating 29 or 38 or both.

It has been found that any hydratable film-forming edible substance may be employed in the present invention and that the film formers may be intermixed and proportioned. Fillers may be added thereto at any stage in the process prior to drying for altering the flavor and texture of the ultimate product without changing the character of the physical structure or the procedure by which such structure is obtained. In some instances, a hydratable film former may be employed naturally having a filler portion which does not interfere with the proteinaceous portion in producing a cellular structure, but, at the same time, may provide a nutty flavor, particularly when roasted. Such film former is exemplified by comminuted wheat germ. Other solid and liquid fillers and modifiers such as sugar and glycerine may be employed without disturbing the basic procedure.

Respecting the oil component, any edible fat or oil may be employed provided it is in liquid condition when dispersed throughout the gel-like mass.

Thus, it is possible to use fats which are plastic at room temperature but which can be made suitable for purposes of this invention by warming them above the melting point but not to a temperature which would denature, char or burn any of the associated components.

A large number of hydratable film-forming substances have been utilized in practicing the invention, all of which substances show utility and demonstrate the wide application of the invention. Similarly, a number of oils and melted fats have been experimentally utilized together with various combinations of film formers. In each case, the novel gel-like dispersion was produced in stable form and then, in turn, was dried to produce the nut-like product. Further, the proportions of the components were varied widely. The oil portion was varied from 25.0 to 85.0 percent, while the hydratable film former varied from 1.5 to 32.0 percent of the gel-like dispersion. Filler material 18 such as sugar, starch, gums, etc. was added in proportions up to 40 percent and the water, either wholly or in combination with another component, was varied from 13.5 to 67.0 percent. It should be noted that gums and some starches can serve as the film-former if hydrated. However, if they remain in particulate form they act as a filler.

When the finished product is packed for shipment, it is preferred to employ moisture-resistant packaging material such as treated plastic film or a combination of plastic film and aluminum foil. Many moisture-resistant packaging films and materials will be apparent to those skilled in the art. It is also preferred to package the product in dry air; e.g. below 30 percent and preferably below 20 percent relative humidity to insure dryness and crispness in the finished product.

The following examples have been selected as showing the wide application of the invention:

EXAMPLE IA (COMPARATIVE EXAMPLE)

Air Mixing

| Formula: | 39.7% | Stabilized Soybean Oil |
|---|---|---|
| | 4.6% | Dried Egg Albumin |
| | 23.2% | Dried Ground Wheat Germ |
| | 6.0% | Sucrose |
| | 0.23% | Black Walnut Flavoring |
| | 26.27% | Water |

Procedure

The dried ingredients were placed in a Hobart mixing bowl and the oil added. The slurry was mixed at No. 2 speed using a paddle mixing blade until oil coated all the dry ingredients and the slurry was smooth. All the water (with the flavoring dissolved therein) was added and mixing continued for 1 minute. The sides of the bowl were scraped down and the mixer set at its highest speed. Mixing was continued for 5 minutes during which a stable dispersion formed. Again the mixer was stopped and the bowl scraped down. Mixing was continued for an additional 5 minutes. This product was then placed on a polyethylene sheet and spread to ⅛ inch thickness and then placed in an air circulating oven set at 180° F. for 45 minutes. This set up the stable dispersion and denatured any enzymes that may be present in the wheat germ. The product was then removed from the oven and cut into pieces ⅞ inch by ½ inch by ⅛ inch and air dried on stainless steel screens at 140° F. for 18 hours in the air circulating oven. This allows incorporation of flavors which would volatize at 180° F.

The resulting product was nut-like and crunchy with the flavor of black walnuts but tended to break at air pockets after initial bite leaving small sandy particles in the back of one's throat.

EXAMPLE IB (INVENTION)

Vacuum Mixing

The same dried ingredients as used in Example IA were placed in a stainless steel Readco mixer equipped with a sigma mixing blade and the oil added. The slurry was mixed at low speed until smooth. At this time the mixer was stopped and all the water (with flavoring dissolved therein) was added. The top of the mixer was then placed on the mixer and a vacuum of 28 inches gauge pressure was pulled and the product mixed at high speed for 15 minutes. A stable dispersion formed during mixing which had a slightly darker appearance due to the removal of the air. This product was then placed on a polyethylene sheet and spread to ⅛ inch thickness and then placed in an air circulating oven set at 180° F. for 45 minutes. This set up the stable dispersion and denatured any enzymes that may be present in the wheat germ. The product was then removed from the oven and cut into pieces ⅞ inch by ½ inch by ⅛ inch and air dried on stainless steel screens for 18 hours at 140° F. in the air circulating oven. This allows incorporation of flavors which would volatize at 180° F.

The resulting product was nut-like and had the bite and flavor of a black walnut. Its bite and smear characteristics were the same as for a natural black walnut.

EXAMPLE II

Synthetic Nut Produced in the Absence of Air or Other Gas

| Formula: | | |
|---|---|---|
| | 39.34% | Stabilized Soybean Oil |
| | 9.87% | Dried Egg Albumin |
| | 15.51% | Sucrose |
| | 4.73% | Sodium Caseinate |
| | 12.40% | Corn Starch |
| | 18.12% | Water |
| | 0.03% | Hazelnut Flavor |
| | 100.00% | |

Procedure

The dry ingredients are mixed together in the oil to form a smooth slurry using a "Lightning" type mixer. This slurry is then pumped into a basin into which is simultaneously pumped the water (with the flavoring dissolved therein). This mixture is then pumped into an "Oakes" type mixer so that no air is allowed to be incorporated into the mix. The Oakes mixer then forms a stable dispersion which is then extruded into ribbons. These ribbons are cut into ½ inch pieces placed on stainless steel screens and air dried at 170° F. for 12 hours. The resulting product was white in color, had the smooth nut-like texture of hazelnuts when eaten and had a pleasant roasted hazelnut flavor. No gas voids were evident in this product.

EXAMPLE III

Procedure Showing Use of Green Vacuum Mixer

| Formula: | | |
|---|---|---|
| | 33.6% | Stabilized Cotton Seed Oil |
| | 5.1% | Dried Egg Albumin |
| | 25.5% | Ground Dried Wheat Germ |
| | 6.7% | Sucrose |
| | 0.6% | Imitation Nut Flavor (Haarman & Reimer) |
| | 28.5% | Water |

Procedure

Added all dry ingredients plus oil to Groen mixer and mixed under 25 inches gauge pressure vacuum until slurry was smooth. Removed vacuum, stopped mixer and added the water (with flavor dissolved therein) in one increment. Pulled 25 inches gauge pressure vacuum and mixed at high speed for 10 minutes during which a stable dispersion was formed. The resulting product was extruded into star shaped rods (about ⅜ inch in diameter) placed upon polyethylene sheets and heat set at 170° F. for 1 hour in an air circulating oven. These rods were cut into 1 inch pieces placed on stainless steel screens and dried at 140° F. in an air circulating oven for 24 hours.

Results

The resulting product had a nut-like bite, with a smooth crunch and smear effect with no small pieces resulting from gas voids. The flavor was nut-like but not of any distinct nut variety.

EXAMPLE IV

Procedure Showing Vacuum Mixing Using a Schnelkutter Mixer, Use of Torula Yeast for Flavoring and the Addition of Salt Before Drying

| Formula: | |
|---|---|
| 55.3% | Stabilized Cotton Seed Oil |
| 16.6% | Ground Dried Wheat Germ |
| 2.0% | Torula Yeast |
| 3.6% | Dried Egg Albumin |
| 2.0% | Sucrose |
| 20.5% | Water |

Procedure

All the dry ingredients plus the oil were placed in the Schnelkutter and mixed under 25 inches of vacuum until a smooth slurry resulted. The mixer was opened and the water added in one increment. Again vacuum was applied (25 inches Hg) and the material mixed for 10 minutes during which a stable dispersion formed. The resulting material was then extruded into shapes resembling cashews on polyethylene sheets and heat set in an air circulating oven for 1 hour at 180° F. The pieces were then air dried in an air circulating oven for 18 hours.

Results

The resulting product has a cashew bite and flavor and had the appearance of cashew halves. The addition of the torula yeast gave this effect which was not able to be done by addition of artificial flavors. No gas voids were present.

In addition, a portion of the material before heat set had salt granules sprinkled on their surface. The salt tended to dissolve at the surface but not completely dissolve and when heat set and subsequently dried the salt dried and remained attached to the surface of the nut, thus giving a uniformly salted nut.

EXAMPLE V

Procedure Showing Vacuum Mixing Using a Read Co. Sigma Mixer, Use of Toasted Rye as a Flavor Ingredient, and the Use of Vacuum Drying for Thick Cross Section Pieces

| Formula: | 32.336% | Stabilized Soybean Oil |
|---|---|---|
| | 8.08% | Dried Egg Albumin |
| | 6.11% | Sucrose |
| | 3.90% | sodium Caseinate |
| | 16.86% | Ground Toasted Cracked Rye |
| | 0.994% | Imitation Roasted Hazel Nut Flavor |
| | 31.72% | Water |

Procedure

Cracked rye is ground through a stainless steel mikropulverizer using an 0.012 inch screen. The ground rye is then toasted at 325° F. for 25 minutes. All the dry ingredients plus the oil are placed in a Read Co. Sigma Mixer and mixed at low speed until smooth. The water (with the flavor dissolved therein) is added in one increment, a vacuum of 28 inches of Hg is placed in the product and mixing is carried out at maximum speed for 15 minutes (a vacuum as low as about 10 inches of Hg can be used). During this time a stable dispersion forms. This product is then shaped into spheres resembling hazelnuts and placed on polyethylene film and set up by heating in an air circulating oven set at 160° F. for 1 hour.

The spheres (about ⅜ inch in diameter) are then placed on stainless steel screens and air dried at 160° F. for an additional 3 hours. This product is then transferred to a vacuum oven set at 160° F. and 28 inch Hg vacuum where they are further dried an additional 16 hours. The resulting products have the bite and flavor or a roasted hazelnut when dipped in a 2 percent caramel color for 3 minutes and then air dried and have the appearance of hazelnuts. No gas voids are present. If vacuum drying is not employed the product will not dry in the center even after 96 hours of drying in an air circulating oven and will discolor and lose its flavor in the center of the piece. The use of the toasted ground rye enables us to get the toasted hazelnut flavor which we could not get using wheat germ as the base.

As mentioned above, compositions prepared in which air or other gas is allowed to contact the dispersion during its formation tend to be nut-like in character but when they were chewed, they often had a tendency to form small pieces that catch in the back of the throat when swallowed. However, when a vacuum is applied during the formation of the dispersion or mixing is conducted without gas present as described herein, this problem is eliminated and the resulting simulated nutmeats are characterized by having a crunchy texture followed by the natural smearing characteristics of a real nutmeat.

The improved eating qualities of the simulated nutmeats prepared using this invention are correlated with physical tests performed on the nutmeats. Thus, the eating qualities of a nut can be variously described as hard or soft, tough or tender, crunchy, smeary, chewy, flacid and so on. It was found that by compressing standard simulated nutmeat pieces in a uniform manner using a fixed rate of compression and a fixed rate of movement of the compression device, the resistance to compression can be recorded on a strip chart as a function of time or displacement.

Simulated nutmeats prepared as described in Examples IA and IB measuring ⅞ inches × ½ inch × ⅛ inch were compressed on an Instron Company testing apparatus to a total deformation of 0.20 inches at a rate of 0.100 inches per minute. After reaching 0.1020 inches of deformation the compression was reversed until original position was reached, the jaws moving at the same rate of 0.100 inches per minute. A second complete cycle (compression followed by decompression to the deformation at the same speed) on the same piece was then completed. This test showed that the nutmeats prepared as in Example IA (air-treated) reached a total compression force F when deformed 0.020 inches of an average of about 2,500 grams. Those prepared in Example IB (vacuum-treated) on the other hand reached a total compression force F of about 5,800 grams. The force F at the end of the first compression was taken as the firmness or hardness of the nut. The distance that the jaws moved together during compression is taken as the elastic recovery E. The area under the curve from the beginning of compression to the end of relaxation represents the work compression on the first cycle. Similarly, the area beneath the curve during the second compression is the work of compression in the second cycle. The ratio of work during the second cycle to the work done during the first cycle is taken as the cohesiveness (C) of the sample. Two other physical perameters are derived from those just mentioned.

$$I = \text{internal strength} = F \times C$$
and
$$S \text{ or smeariness} = F \times C \times E.$$

Typical values obtained during these tests are shown in Table I. The three columns at the left are three samples prepared as in Example IB while the three columns at the right are three different samples prepared as in Example IA.

TABLE I

|   | Example IB Samples | | | Example IA Samples | | |
|---|---|---|---|---|---|---|
| F | 6190 g. | 7140 g. | 8550 g. | 2680 g. | 5700 g. | 6050 g. |
| E | .0068 " | .0064 " | .0062 " | .0040 " | .0034 " | .0070 " |
| C | 0.284 | 0.230 | 0.198 | 0.350 | 0.180 | 0.173 |
| I | 1760 g. | 1640 g. | 1693 g. | 938 g. | 1025 g. | 1048 g. |
| S | 12.0 g. in. | 10.5 g. in. | 10.5 g. in. | 3.75 g. in. | 3.49 g. in. | 7.33 g. in. |

By reference to Table I, it will be seen that the internal strength I is much greater in the case of vacuum-treated nutmeats than those prepared as in Example IA and the nutmeats are thus more crunchy or chewy. Moreover, the S value is also more than double that of the old composition.

It will thus be seen that this invention provides a novel simulated nutmeat product which has greatly improved textural characteristics and eating qualities compared with similar products prepared in the presence of a gas such as air. These textural characteristics are reflected in their physical properties. It should, however, be made clear that physical tests alone cannot characterize the simulated nuts because their texture varies greatly from one nut variety to another as from cashews which are soft to almonds which are much harder. The improved product can be obtained either by vacuum mixing or by mixing in the absence of added gas such as air. While gas can be excluded in numerous ways it is preferred to use a mixer which is filled completely with the material being mixed.

The invention has a further advantage when wheat germ is employed for flavoring. It has been found that the drying at elevated temperatures prevents enzyme activity. At the same time, however, the loss of volatile flavors is prevented which is of course desirable.

A further advantage of the invention is that flavoring materials such as salt can be adhered reliably to the surface of the simulated nutmeats by applying the salt prior to the removal of moisture. Thus, it appears that the moisture present in the simulated nutmeats moistens the surface of the salt and promotes the formation of a bond between the nutmeat and the salt and that this bond is later rigidified when the last traces of moisture are removed.

A further advantage of one aspect of the invention is the use of Torula yeast to obtain a cashew nut flavor as described in Example IV. The Torula yeast can be easily processed at a reasonable cost and provides an excellent cashew nut flavor.

A still further advantage of the invention is described in Example V wherein toasted ground rye is used as a nut base. The toasted rye can be easily obtained and was found to provide a very tasty base which was characterized by an absence of a maple note which is sometimes undesirable especially in preparing simulated hazelnuts.

Another aspect of the invention is the effectiveness of vacuum-drying to achieve uniform and effective drying of relatively thick simulated nut pieces, as for example those over about 3/16 of an inch thick as described in Example V. It was thus found that even though thick pieces were dried, moisture distribution could be maintained quite uniformly throughout each piece. The pieces could be thereby rendered stable against deterioration and could be made to have the same texture throughout.

We claim:

1. A process for making a nut-like product which comprises intermixing about 1.5 to 32 percent by weight of an edible, hydratable film-forming substance with about 25 to about 85 percent by weight of an edible, water-immiscible, oleaginous material in liquid form, and water in the amount of from about 13.5 to about 67 percent by weight to hydrate the film-forming substance, beating to disperse the water-immiscible oleaginous liquid and form a continuous cellular film which isolates and entraps globules of the oleaginous liquid thereabout, near the beginning of mixing maintaining the dispersion free from exposure to gas and maintaining the mixture free from exposure to gas to the end of mixing whereby the oleaginous material is dispersed homogeneously in the continuous phase composed of said edible film-forming substance under conditions which exclude air and then slowly drying the cellular film to a moisture content of about 10% or less while preserving the continuity thereof.

2. The process of claim 1 wherein the film forming substance is a proteinaceous material and the dispersion maintained free from exposure to gas by applying a vacuum thereto.

3. The process of claim 1 wherein the dispersion is placed in a mixing vessel until completely filled with the dispersion thereby excluding gas from the vessel.

4. The process of claim 1 wherein the nut-like product is heated prior to drying at a temperature of at least about 170°F. for at least about 20 minutes to thereby destroy enzyme activity and then slowly drying the cellular film at a lower temperature while preserving the continuity thereof.

5. The process of claim 1 wherein salt is applied to the product before it is dried to obtain a strong bond between the salt and the product.

6. A process of claim 1 wherein a solid, granular-flavoring material is applied to the surface of the nut-like product prior to drying the same and the product is slowly dried while preserving the continuity thereof whereby the drying of the nutmeats causes rigidification of the bonds formed between the granular-flavoring material and the surface of the nutmeats.

7. A process of claim 6 wherein the vacuum applied is at least about 10 inches of mercury.

8. The process of claim 1 wherein the slow drying of the cellular film is carried out under vacuum.

9. A food product prepared by the process of claim 1.

10. A product of claim 9 wherein the food product includes as a flavoring material a quantity of Torula yeast to provide a cashew nut flavor.

11. A product of claim 9 wherein the food product includes as a flavoring material a quantity of toasted, ground rye to provide a nut flavor.

12. The food product of claim 9 wherein an edible coloring material is applied to the surface thereof and an edible, moisture resistant coating is applied over the coloring material and upon all surfaces thereof to protect the product from becoming soggy.

13. An ice-cream product comprising a quantity of ice-cream and the food product of claim 9 incorporated therein.

* * * * *